Feb. 7, 1956  R. V. WHITELEY  2,733,935
RELEASABLE LOCK FOR A COMPENSATING TONGUE UNIT OF
A LOGGING TRUCK AND TRAILER COMBINATION
Filed Aug. 18, 1953  2 Sheets-Sheet 1
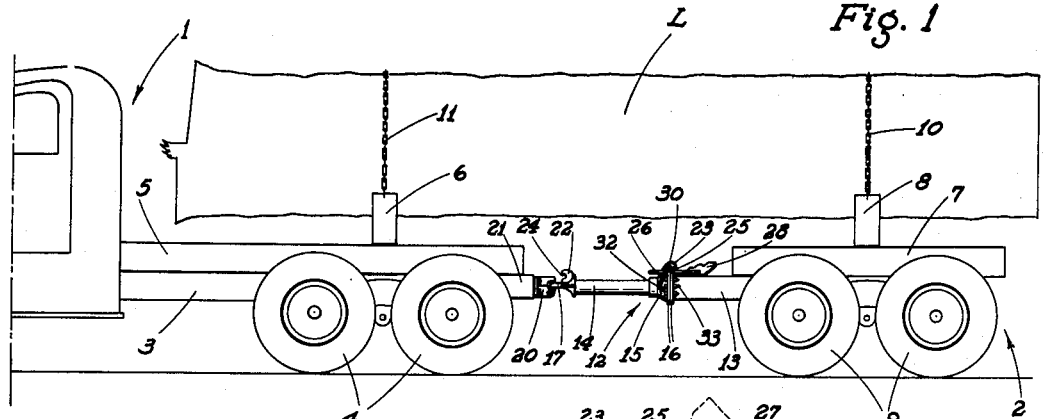
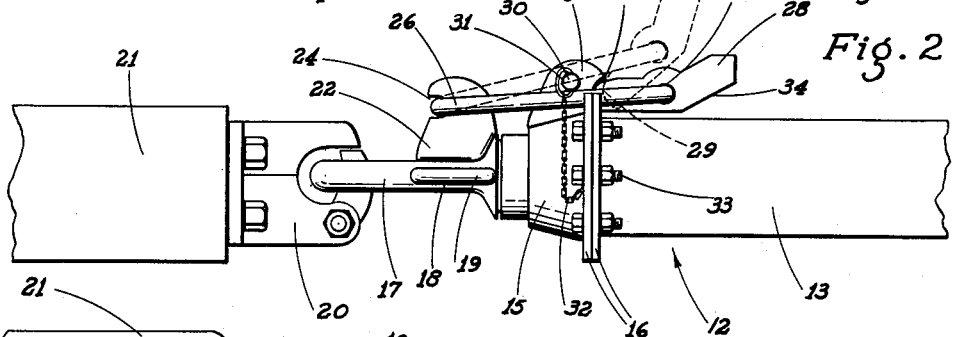
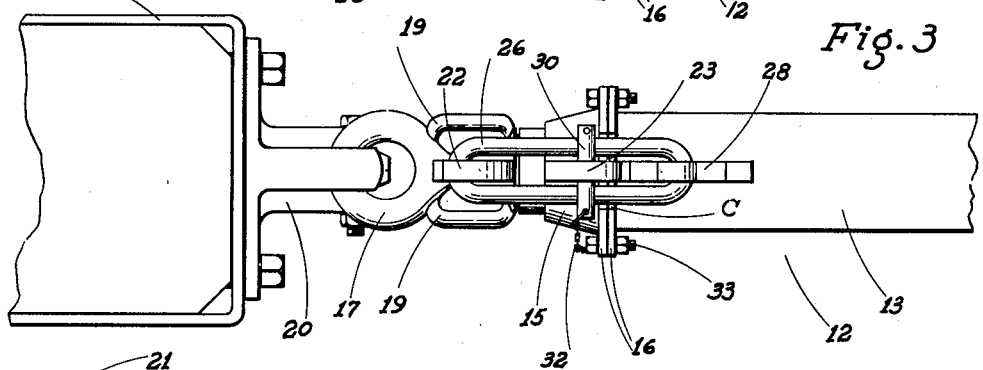
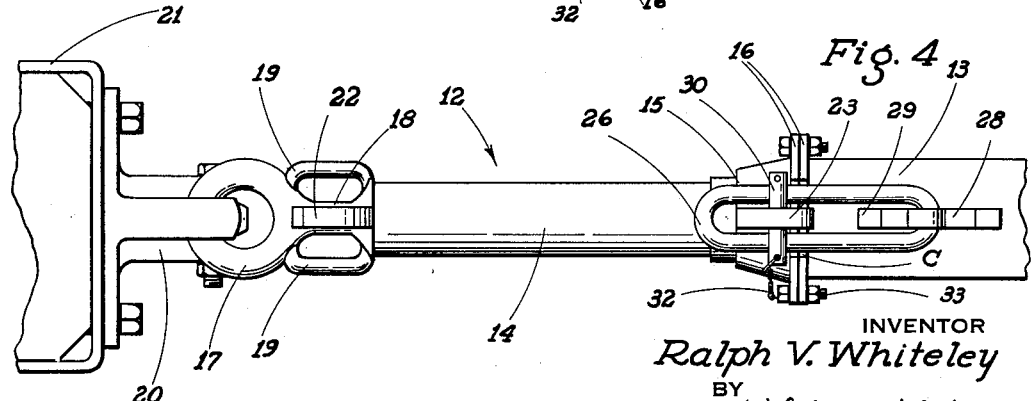
INVENTOR
Ralph V. Whiteley
BY
Webster & Webster
ATTYS

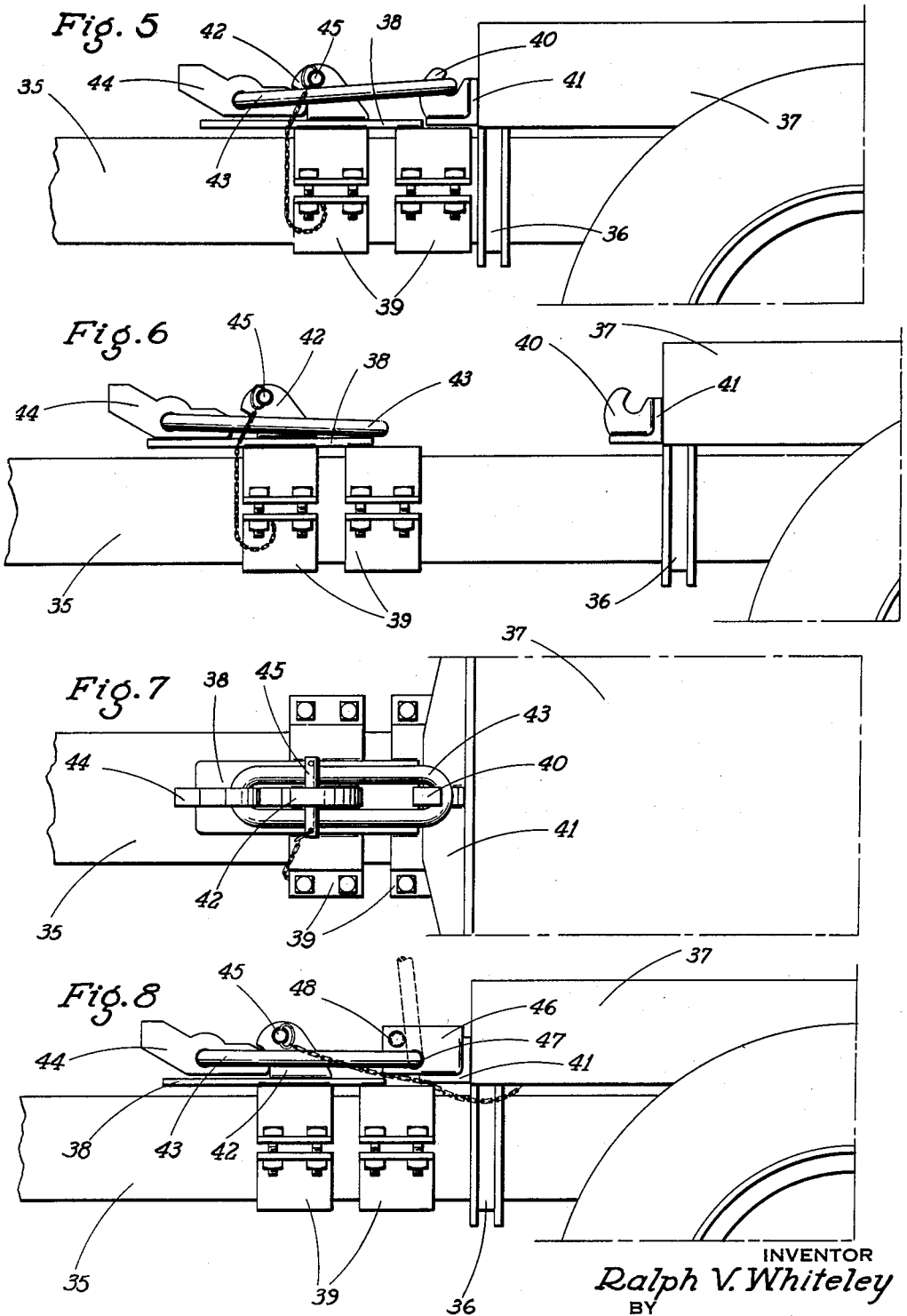

United States Patent Office 2,733,935
Patented Feb. 7, 1956

2,733,935
RELEASABLE LOCK FOR A COMPENSATING TONGUE UNIT OF A LOGGING TRUCK AND TRAILER COMBINATION

Ralph V. Whiteley, Clipper Mills, Calif.

Application August 18, 1953, Serial No. 374,952

2 Claims. (Cl. 280—477)

In the logging industry it is the practice to transport the logs chain-secured to, cradled on, and spanning between, a truck and trailer, such truck and trailer being coupled together by a tongue unit of compensating type; i. e. having parts which are relatively slidable longitudinally whereby to permit the tongue unit to vary in its effective length, as—for example—when the truck and trailer are making a turn, and when extension of said tongue unit must then occur.

It is a major object of the present invention to provide a novel lock, for a compensating tongue unit as above, adapted to releasably secure the relatively slidable parts of the tongue unit in a contracted position, and to then maintain such parts against relative sliding motion; the lock being used when the truck and trailer combination is running empty, and at which time the length of the tongue unit must remain the same. The lock may also be used during log loading operations whereby to prevent a log, when being loaded, from moving the trailer relative to the truck.

Another important object of this invention is to provide a lock, for the purpose described, which is strong, positive, and safe when in use, yet quick-releasable when desired.

An additional object of this invention is to provide a lock, for a compensating tongue unit, which comprises, in combination with catch elements secured in connection with the relatively slidable parts of the tongue unit, a novel connector link and swinging dog assembly; the link cooperating in holding relation with one catch element, and the dog with the other.

It is also an object of the invention to provide a lock, for a compensating tongue unit, which is designed for ease and economy of manufacture, and convenience of installation and use.

Still another object of the invention is to provide a practical and reliable lock, for a compensating tongue unit, and one which will be exceedingly effective for the purpose for which it is designed.

These objects are accomplished by means of such structure and relative arrangement of parts as will fully appear by a perusal of the following specification and claims.

In the drawings:

Fig. 1 is a side elevation of a truck and trailer combination carrying a log; the compensating tongue unit being partially extended, and the lock being shown in its released position.

Fig. 2 is an enlarged fragmentary side elevation showing the compensating tongue unit contracted, and with the lock shown in full lines in its holding position; the connector link and swinging dog assembly being shown in dotted lines in partially released position.

Fig. 3 is an enlarged fragmentary plan view showing the compensating tongue unit and lock in holding position, as in Fig. 2.

Fig. 4 is an enlarged fragmentary plan view showing the compensating tongue unit partially extended, and the lock in its released position, as shown in Fig. 1.

Fig. 5 is an enlarged fragmentary side elevation showing the lock as used in connection with a modified type of compensating tongue unit; the lock being shown in its holding position.

Fig. 6 is a similar view but shows the compensating tongue unit partially extended, with the lock in its released position.

Fig. 7 is an enlarged fragmentary plan view showing the lock in the same position as in Fig. 5.

Fig. 8 is an enlarged fragmentary side elevation showing a modification of the lock illustrated in Fig. 5; the lock being in holding position in full lines and in released position in broken lines.

Referring now more particularly to the drawings and to the characters of reference marked thereon, and at present to the embodiment of Figs. 1–4, inclusive, the numerals 1 and 2 indicate generally the truck and trailer, respectively; the truck including a main frame 3 supported by rear wheels 4. A bed 5 on the frame 3 carries a cradle 6.

The trailer 2 includes a bed 7 provided with a cradle 8; the trailer wheels being indicated at 9. A log L, being transported, rests in and spans between the cradles 6 and 8, being secured therein by chains 10 and 11.

The truck 1 and trailer 2 are connected together by a compensating type tongue unit, indicated generally at 12, which comprises the following:

A longitudinal tubular guide sleeve 13 is fixed centrally of, and projects from, the trailer 2, and a tongue 14 engages slidably or telescopically in said guide sleeve 13 from its forward end; said end of the guide sleeve being fitted with an end cap 15.

The end cap 15 is secured to the guide sleeve 13 by mating, bolted-together flanges 16. At its forward end the tongue 14 is fixed with a vertical axis eye 17 which has an exposed shank 18; there being hand grips 19 on opposite sides of said shank.

The eye 17 is normally engaged with a hitch 20 secured to a member 21 on the rear end of the truck frame 3.

The above described compensating tongue unit is conventional, and in connection therewith I employ the following novel releasable lock:

The lock comprises upstanding ears 22 and 23 fixed, as by welding, on the shank 18 and end cap 15, respectively. The upstanding ear 22 is formed with a forwardly opening notch 24, while the upstanding ear 23 is formed with a rearwardly opening notch 25.

An elongated slotted connector link 26, of a length greater than the spacing of the ears 22 and 23 when the tongue unit is contracted, extends lengthwise with said ears projecting upwardly through such link when the lock is in holding position. At such time the forward end of the link 26 seats in the notch 24 in ear 22; the rear end of the link then being disposed some distance rearwardly of the notch 25 in ear 23.

At its rear end the link 26 extends, in pivotal relation, through a cross bore 27 in an elongated locking dog 28 substantially centrally of the ends of the latter.

At its forward end the locking dog 28 is rounded, as at 29, and said end forcefully seats in the notch 25 when the locking dog is swung downwardly and rearwardly to a substantially horizontal holding position, as in Fig. 2; the notch 25 being rounded to match the end 29.

With the connector link 26 and dog 28 in locking position, as above, the sleeve 13 and tongue 14 are positively secured against relative sliding motion; i. e. the compensating tongue unit cannot extend. The parts are releasably maintained in this position by a cross pin 30 which removably projects through a cross bore 31 in the ear 23 above the connector link 26, thus preventing the latter—together with the dog 28—from swinging upwardly to a released position. In order to prevent loss of the cross pin 30 it is attached by a safety chain 32 to one of the bolts 33 which secure the flanges 16 together.

When the locking parts are in holding position, as in Figs. 2 and 3, with the end 29 of dog 28 engaged in the notch 25 of ear 23, the link 26 is under tension, maintaining the compensating tongue unit fully retracted and against loose-play between the sleeve 13 and tongue 14.

The mating flanges 16 are cut away on top, as at C, in order not to obstruct the connector link 26 when it is in locking position.

The above described lock is used, in its holding position, when the truck and trailer are running empty, or when the same are being loaded with a log.

Preparatory to the loaded truck and trailer traveling on the road, the described lock is released as follows:

Firstly, the cross pin 30 is removed and then the dog 28 is swung upwardly and forwardly, swinging about the corresponding end of the link 26 as an axis; such swinging motion ultimately releasing the dog from the notch 25 in ear 23. When this occurs the link 26 is detached from the ear 22 and is drawn rearwardly to clear the latter, whereupon the cross pin 30 is replaced. See Fig. 4. In this released position of the parts the compensating tongue unit is operative; i. e., the tongue 14 may slide in and out of the sleeve 13 during travel of the truck and trailer, such sliding occurring particularly when the vehicle traverses a corner.

As an aid to releasing the locking dog 28 from its holding position, as in full lines, to its initial released position as in broken lines, in Fig. 2, the rear end portion of said dog is formed with a lower edge 34 which inclines upwardly and rearwardly relative to the sleeve 13; this to the end that a pinch bar may be inserted between said edge and sleeve to forcefully raise the dog 28 at the rear portion thereof, and as required to swing the dog out of its locked or holding position.

In the embodiment of Figs. 5, 6, and 7 the lock is shown as used in connection with a somewhat different type of compensating tongue unit. Here the tongue 35 which extends rearwardly from the truck is carried in slidable relation in guides, one of which is shown at 36, depending from the trailer bed 37.

A horizontal base plate 38 is disposed above the tongue 35 and is attached thereto in longitudinally adjustable relation by a pair of split collars 39 on said tongue 35, and to which collars the base plate 38 is welded.

In this embodiment the structure of the lock remains substantially the same, except that it is reversed longitudinally. Here the upstanding notched ear 40 which corresponds to the ear 22 of the previous embodiment is at the rear end and is fixed, as by welding, to an angle bar 41 on the front end of the trailer bed 37, thus being fixed with respect to the guides 36 through which the tongue 35 slides.

The other upstanding notched ear 42 which corresponds to the ear 23 of the previous embodiment is fixed on the base plate 38.

The connector link 43 and the dog 44 are constructed as before, and are used in the same manner; the link 43 engaging at the rear end in the notched ear 40, while the dog 44 cooperates with the notched ear 42. In this embodiment the lock is releasably maintained in its holding position by a cross pin 45 which corresponds to, and is used in the same manner as, the cross pin 30 of the previous embodiment.

In the embodiment of Fig. 8 the compensating tongue unit, together with the lock structure, is the same as in Figs. 5, 6, and 7; the parts bearing corresponding reference numerals, saving and excepting that the ear 40 is replaced by an upstanding attachment ear or plate 46 having a cross bore 47 through which the rear end of the connector link 43 extends in pivoted relation; thus being non-detachable from the trailer.

When the lock is released in this embodiment the link 43 is swung to an upstanding position, as shown in broken lines in Fig. 8, and during the time that the lock remains released is held in such position by the cross pin 45; the latter being projected through a cross bore 48 in the plate 46 ahead of the upstanding link 43.

From the foregoing it will be recognized that the present invention provides a very effective, positive, and practical—yet quick-releasable—lock for securing the parts of a compensating tongue unit against relative sliding motion, to the end that said unit may be locked up against any change in its effective length when the truck and trailer are running empty.

From the foregoing description it will be readily seen that there has been produced such a device as will fulfill the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A releasable lock for a compensating tongue unit, coupled between a truck and trailer, which includes a tongue and a guide member in initially relatively slidable relation, one being attached to the truck and the other to the trailer; said lock comprising a pair of separate ears corresponding to said tongue and member and fixed in connection therewith, said ears projecting in the same direction from the tongue unit and being adjacent each other when said unit is contracted, the ears each having a notch formed therein and said notches opening longitudinally away from each other, a link at one end releasably engaging in the notch of the adjacent ear, the other end of the link extending beyond the other ear, a longitudinal dog pivoted intermediate its ends on said other end of the link for swinging about a transverse axis, one end portion of the dog normally extending into the link from said other end thereof and detachably engaging in the notch of said other ear, the other end portion of the dog forming a lever whose movement in a predetermined direction swings said dog to release it from said other ear, and releasable means adapted to prevent disengagement of the dog from said other ear; said releasable means comprising a cross pin adapted to be removably projected through a bore provided in the other ear above the link when the latter is in a locked position.

2. A releasable lock for a compensating tongue unit, coupled between a truck and trailer, which includes a tongue and a guide member in initially relatively slidable relation, one being attached to the truck and the other to the trailer; said lock comprising a pair of separate ears corresponding to said tongue and member and fixed in connection therewith, said ears projecting in the same direction from the tongue unit and being adjacent each other when said unit is contracted, an elongated slotted link, the link at one end being pivoted on the adjacent ear for swinging about a transverse axis, the other ear projecting through the link intermediate its ends, a dog pivoted intermediate its ends on the other end of the link for swinging about a transverse axis, the dog normally having one end portion within the link and such portion being adapted to detachably engage said other ear, a cross pin adapted to be removably projected through a bore in the other ear above the link when the latter is in a locked position; the adjacent ear being formed with a cross bore to receive the pin when withdrawn from said other ear, the last named bore being disposed so that the pin when inserted therein will maintain the link, when the latter is released from the other ear, in a position clear thereof.

References Cited in the file of this patent

UNITED STATES PATENTS

| 102,067 | Tuttle et al. | Apr. 19, 1870 |
| 1,444,020 | Alborn | Feb. 6, 1923 |
| 1,576,565 | Whitten | Mar. 16, 1926 |
| 2,174,063 | Richards | Sept. 26, 1939 |
| 2,520,776 | Page | Aug. 29, 1950 |

FOREIGN PATENTS

| 397,193 | France | Apr. 30, 1909 |